(12) United States Patent
Kueppers et al.

(10) Patent No.: US 11,077,784 B2
(45) Date of Patent: Aug. 3, 2021

(54) HEADLAMP ASSEMBLY FOR A VEHICLE BODY

(71) Applicant: FORD GLOBAL TECHNOLOGIES, LLC, Dearborn, MI (US)

(72) Inventors: Christoph Kueppers, Kerpen (DE); Martin Otto Alfred Konrad, Wermelskirchen (DE); Antje Sipido, Frechen (DE)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 323 days.

(21) Appl. No.: 16/125,130

(22) Filed: Sep. 7, 2018

(65) Prior Publication Data
US 2019/0077297 A1   Mar. 14, 2019

(30) Foreign Application Priority Data

Sep. 12, 2017   (DE) ..................... 10 2017 216 064.0

(51) Int. Cl.
*B60Q 1/00*   (2006.01)
*B60Q 1/04*   (2006.01)

(52) U.S. Cl.
CPC ......... *B60Q 1/0005* (2013.01); *B60Q 1/0064* (2013.01); *B60Q 1/0408* (2013.01); *B60Q 1/0433* (2013.01); *B60Q 1/0491* (2013.01); *B60Q 2900/10* (2013.01)

(58) Field of Classification Search
CPC .. B60Q 1/0005; B60Q 1/0064; B60Q 1/0408; B60Q 1/0433; B60Q 1/0491; B60Q 2900/10

USPC ........................................................ 362/549
See application file for complete search history.

(56) References Cited

U.S. PATENT DOCUMENTS

| | | | |
|---|---|---|---|
| 6,257,749 B1 * | 7/2001 | Ward .................. | B60Q 1/0491 362/368 |
| 6,478,456 B1 | 11/2002 | Eichhorn et al. | |
| 9,211,836 B2 | 12/2015 | Eckert et al. | |
| 2002/0145881 A1 | 10/2002 | Yamada et al. | |
| 2004/0125584 A1 | 7/2004 | Arlon et al. | |
| 2009/0196065 A1 * | 8/2009 | Joly-Pottuz .......... | B60Q 1/0433 362/549 |

FOREIGN PATENT DOCUMENTS

| | | | | |
|---|---|---|---|---|
| GB | 2506206 A | * | 3/2014 | .......... B60Q 1/0491 |
| WO | 2014048974 A1 | | 4/2014 | |

* cited by examiner

*Primary Examiner* — Andrew J Coughlin
*Assistant Examiner* — Jessica M Apenteng
(74) *Attorney, Agent, or Firm* — David L. Coppiellie; Brooks Kushman P.C.

(57) ABSTRACT

The invention relates to a component group for a vehicle body, having a headlamp housing, which has at least one connecting portion integrally formed in one piece for connection to an adjoining body part, and a predetermined breaking point for separation of the connecting portion from a neighboring portion. To minimize both the repair costs in the event of a collision at low speed in the region of the headlamp and also the costs for production and assembly, it is provided according to the invention that the neighboring portion has connecting structures for connection to a joining part with which the connecting portion is replaceable after its separation.

13 Claims, 7 Drawing Sheets

HEADLAMP ASSEMBLY FOR A VEHICLE BODY

CROSS-REFERENCE TO RELATED APPLICATIONS

This application claims foreign priority benefits under 35 U.S.C. § 119(a)-(d) to DE Application 10 2017 216 064.0 filed Sep. 12, 2017, which is hereby incorporated by reference in its entirety.

TECHNICAL FIELD

The invention relates to a headlamp assembly and connections to a vehicle body.

BACKGROUND

In modern motor vehicles, the safety of the occupants as well as other road users in the event of a collision is of the utmost priority. So far as this allows, it is also additionally desirable to keep the repair costs as low as possible. This applies in particular to collisions at low speed, in which possible damage can remain limited to a small number of vehicle components and damage which may occur to the relevant vehicle components is low. The resultant damage or the incidental repair costs can be determined by means of appropriate crash tests at low speed and can influence the insurance contributions to be paid.

A typical scenario in the event of a collision at low speed consists in the vehicle hitting an obstacle with a headlamp. The headlamp housing is normally connected to a front fender, amongst other things, which in turn adjoins a front door. In this case, a typical damage pattern comprises damage to the headlamp housing, considerable deformation of the fender owing to the force applied on the part of the headlamp housing and damage to the paintwork of the adjoining door. This latter is the result of the fender being pushed rearward by the headlamp housing.

With regard to mandatory effective pedestrian protection, it is required in this case that predetermined breaking points are present in the region of the connections of the headlamp housing to adjoining body parts, that the rigidity of the connection of the fender to the vehicle body furthermore remains limited in the vertical direction and that the vehicle can yield in the direction of the X axis in the region of the headlamp. Against this background, it is hardly possible to protect the fender from damage by limiting the mobility of the headlamp housing. Moreover, it should be taken into account that the headlamps in modern vehicles are high-value components. In this regard, a concept which is willing to accept the headlamp being damaged or destroyed in order to protect the fender would elevate repair costs.

WO 2014/048974 discloses a mount for a headlamp. This has attaching points for a headlamp assembly on the one hand and for a vehicle body and a front bumper on the other. In this case, the mount can have predetermined breaking points by means of which the attaching points for the headlamp assembly can be separated. It should hereby be achieved in particular that, in the event of a collision at low speed, the headlamp assembly separates from an adjoining body component and damage thereto is prevented.

U.S. Pat. No. 6,478,456 B1 discloses a headlamp having a housing which is received in a receptacle of a vehicle body. In the event of an accident, the forces applied can result in a displacement of the housing within the receptacle, wherein energy-absorbing elements are arranged therebetween. In normal operation, the position of the housing is secured by guide elements which break off if a particular applied force is exceeded.

US 2004/0125584 A1 discloses an assembly having a headlamp whereof the housing is connected to a vehicle body by various connecting means. In this case, each connecting means has a plurality of predetermined breaking points which yield in succession if a force is applied to the housing and therefore enable a gradual displacement of the housing.

U.S. Pat. No. 9,211,836 B2 discloses a headlamp assembly, in which a housing of a headlamp is fastened to an upper mount via a bracket element which has a predetermined breaking point. The housing engages with a lower mount, which is designed such that a pivotal movement of the housing is possible when the predetermined breaking point yields. If a predetermined pivot angle is exceeded and a force is furthermore applied, a second predetermined breaking point on the lower mount yields so that the housing detaches completely from the vehicle body.

With regard to the demonstrated prior art, the limitation of the damage in the event of a collision at low speed in the region of a headlamp still offers room for improvement.

SUMMARY

One object of this disclosure is minimizing both the repair costs in the event of a collision at low speed in the region of the headlamp and the costs for production and assembly. This is achieved by protecting high-value components from damage and minimizing the repair costs. At the same time, it is desirable to minimize the costs for production and assembly.

The features and measures described individually in the description below can be combined with one another in any technically useful manner and demonstrate further embodiments of the invention. The description additionally characterizes and specifies the invention in conjunction with the figures.

A component group for a vehicle body is disclosed. The term "component group" refers to at least one component, normally a plurality of components, both in the assembled state and in the form of individual parts which are still to be assembled.

The component group has a headlamp housing, which has at least one connecting portion integrally formed in one piece for connection to an adjoining body part, and a predetermined breaking point for separation of the connecting portion from a neighboring portion. The headlamp housing is typically formed from plastics material, wherein, in a known manner, the plastics material can be coated with reflective material in a rear region to achieve a desired formation of a light cone. A part or a portion of the headlamp housing can consist of transparent material. The headlamp housing normally has openings or receptacles for a multiplicity of light sources, e.g. for low beam, parking light, turn signals etc.

The connecting portion serves for connection to an adjoining body part, for example, to a fender. It is integrally formed in one piece on the headlamp housing, normally during a primary forming process. If the headlamp housing is inherently formed in a plurality of parts, the connecting portion is formed in one piece with one of the parts of the headlamp housing. The connecting portion can have one or more through-openings, for example, for receiving screws by means of which it is fastened to the adjoining body part.

Alternatively or additionally, a pin can be formed, for example, which engages in an opening or depression of the adjoining body part.

The neighboring portion is arranged adjacent to the connecting portion. This neighboring portion is formed in one piece with the connecting portion, wherein a predetermined breaking point is arranged between the two portions. It goes without saying that this predetermined breaking point is provided to yield as planned as soon as a force applied between the headlamp housing and the neighboring body part has exceeded a threshold force. In this case, the magnitude of the threshold force can be selected such that it can be exceeded in the event of a collision at low speed.

The neighboring portion has connecting structures for connection to a joining part with which the connecting portion is replaceable after its separation. If the connecting portion has been separated from the neighboring portion in the event of an accident, the headlamp housing can still be used. Provided that the headlamp housing is otherwise substantially undamaged, a joining part which assumes the function of the separated connecting portion can be connected to the neighboring portion. To this end, connecting structures via which the connection to the joining part may be produced are formed in the neighboring portion.

The costs for production and assembly are kept low on the one hand, since the connecting portion is integrally formed in one piece on the headlamp housing. This therefore dispenses with the production of a separate mount and the assembly effort involved for connecting this to the headlamp housing. In some circumstances, a single-piece configuration also contributes to a reduction in weight. At the same time, the repair costs can be considerably reduced since the connecting portion can be replaced after its separation by the joining part so that it is not necessary to change the headlamp housing completely. It goes without saying that the presence of the predetermined breaking point reduces the load on the headlamp housing and possibly also on the adjoining body part.

The connecting structures are preferably designed for form-fitting connection. In this case, the form fit can be provided directly with the joining part or with an interconnected element which connects the neighboring portion to the joining portion. Such an element can be for example a screw, a rivet or the like. In this case, it goes without saying that the form-fitting connection can be supplemented by a force-fitting connection and possibly by a further form-fitting and/or material-fitting connection.

The connecting structures can have at least one through-opening for a screw. Such a through-opening can be formed in a sleeve portion which extends in the direction of the through-opening in order to improve the engagement between the screw and the neighboring portion. The through-opening can have an internal thread. Alternatively, the through-opening can also be designed to be smooth, wherein it is provided that the screw cuts the internal thread itself as it is screwed in. To improve the connection of the joining part to the neighboring portion, the connecting structures can have a multiplicity of through-openings (e.g. two or three) for screws.

The component group can have a joining part for connection to the connecting structures on the one hand and to the adjoining body part on the other. In this case, the joining part is preferably designed to produce a form fit with the neighboring portion, at least in sections. The form of the joining part can be complementary to the form of the neighboring portion, at least in sections. Likewise, the joining part can have second connecting structures corresponding to the connecting structures of the neighboring portion, for example through-openings for screws, whereof the number and arrangement correspond to through-openings within the neighboring portion. Since the function of the joining part consists in replacing the separated connecting portion, it normally has third connecting structures which correspond in terms of form and position to connecting structures of the connecting portion. If the connecting portion has, for example, a through-opening for a screw, the joining part has a corresponding through-opening whereof the position corresponds to that of the connecting portion after the joining part has been connected as intended to the neighboring portion.

To ensure that the separation of the connecting portion takes place with as little disruption as possible, wherein the neighboring portion remains undamaged, this neighboring portion can be structurally reinforced. In this case, at least one web can be formed in the neighboring portion for reinforcing purposes. Such a web can also be referred to as a rib and serves to stabilize the structure of the neighboring portion without excessively increasing the weight caused by the use of unnecessary material. Normally, the headlamp housing is designed to have relatively thin walls, wherein a corresponding web projects from the wall. A multiplicity of webs can also be provided, which can extend approximately parallel, for example. Other structures are also conceivable, for example a multiplicity of webs which together form a zigzag pattern or cross one another.

The headlamp housing conventionally has a multiplicity of connecting portions. In this case, all connecting portions are provided for connection to adjoining body parts. One of the connecting portions can be provided for connection to a fender or to a frame part of the body, whilst another connecting portion can be provided for connection to a bumper, for example. A multiplicity of connecting portions can each be separable from a neighboring portion as a result of a predetermined breaking point. In addition, one or more connecting portions can be connectable to an adjoining body part in such a way that they can be detached therefrom in a non-destructive manner under the application of a correspondingly high relative force in the event of a collision. For example, the connecting portion could have an elastic element as part of a latching connection or snap connection.

As already explained, an adjoining body part can be in particular a fender. Therefore, the component group can have a fender, wherein at least one connecting portion is designed for connection to the fender. In the assembled state, the at least one connecting portion is connected to the fender. For example, the connecting portion can have a pin element which engages in an opening in the fender.

The fender preferably has an attaching structure for connection to a vehicle body, wherein the attaching structure is designed to yield as planned under the application of a force on the part of the headlamp housing. In this case, the attaching structure can have one or more predetermined breaking points at which a detachment or separation of material of the fender takes place. The fender is conventionally formed either from sheet metal or possibly from a thin-walled plastics material resembling sheet metal. In this case, the attaching structure can have one or more through-openings which have been generated for example by punching. As an alternative to a predetermined breaking point, a non-destructive yielding of the attaching structure would also be conceivable in principle, for example because of an elastic and/or inelastic bending thereof. In this case, a relative movement of the fender with respect to the vehicle body is enabled as a result of the yielding of the attaching structure. This can be in particular a movement extending at least proportionally in the Y direction (transverse direction) of the vehicle. As a result of the relative movement, in particular when this extends in the transverse direction, a deflection of the fender is possible under the application of a force on the part of the headlamp housing, whereby, on the one hand, the force reacting upon the headlamp housing can remain limited and damage thereto can therefore be prevented or limited (e.g. to a predetermined breaking point). On the other hand, at least in the event of a collision at low speed, it can be prevented that the fender is pressed rearward in the longitudinal direction, thus causing damage (e.g. damage to the paintwork) of a vehicle door. The described attaching structure is advantageously arranged in a front region of the fender. In this case, another attaching structure, which does not yield or only yields under the application of considerably higher forces, can be provided for example in a rear region of the fender (as seen in the X direction). This enables a type of pivotal movement or lateral bending of the fender, in which the front attaching structure detaches whilst the rear attaching structure remains approximately stationary.

The attaching structure can have a through-opening for a screw, wherein an extent of the through-opening in the Y direction is greater than an extent of a head of the screw. This therefore refers to a through-opening which is enlarged or dimensioned to be oversized in relation to the screw head. This is based on the extent or dimension in the Y direction, i.e. in the transverse direction of the vehicle, which is greater for the through-opening than for the screw head. The screw head is therefore unable to cover the through-opening completely in the Y direction. As a result of such an enlargement, stresses within the fender can be reinforced locally under the application of a force, thereby promoting a yielding of the material in the region of the through-opening. To generate a stress concentration with which a yielding or splitting is introduced, it is advantageous or even required that the through-opening is not covered completely. The stress which occurs is then greatest at the transition between the covered and non-covered region. The extent of the through-opening can be, in particular, at least 50% greater than that of the screw. The yielding of the material can also possibly be promoted in that the through-opening has a non-circular cross-section, for example a polygonal, in particular quadrangular cross-section. "Polygonal" or "quadrangular" means that the corners of the corresponding polygon can be rounded. The through-opening can furthermore preferably be delimited on the inside in the Y direction by a web whereof the extent in the Y direction is, at most, 50% of the extent of the through-opening. In this case, the said web is formed by a sheet metal or thin-walled plastics material of the fender and can adjoin an inner edge of the fender, as seen in the Y direction (transverse direction). The direction of extent of the web can correspond to the X direction. In this case, it goes without saying that all statements relate to the intended integrated state of the fender. If a width of the web in the Y direction is, at most, 50% of a width of the through-opening, the web can be regarded as "thin", which makes it easier to yield as planned. When an appropriate force is applied, the shaft of the screw can load the web in such a way that it severs or is even separated.

It has been shown that it can be advantageous if the fender has, in front of and behind the through-opening in the X direction, two slots extending in the Y direction. In this case, it goes without saying that the slots are at a spacing to the front and behind the through-opening, albeit preferably adjacent thereto. In this case, a web can in turn be formed between each slot and the through-opening. The slots can be designed to be linear and can extend in the Y direction. The presence of the slots can facilitate the yielding of the attaching structure, wherein the shaft of the screw possibly breaks out of the through-opening in the direction of a slot before breaking through laterally to the edge of the fender.

Further advantageous details and effects of the invention are explained in more detail below with reference to different exemplary embodiments illustrated in the figures, which show:

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention. In the different figures, the same parts are always denoted by the same reference signs, which is why they are generally also described only once.

Figure 1:
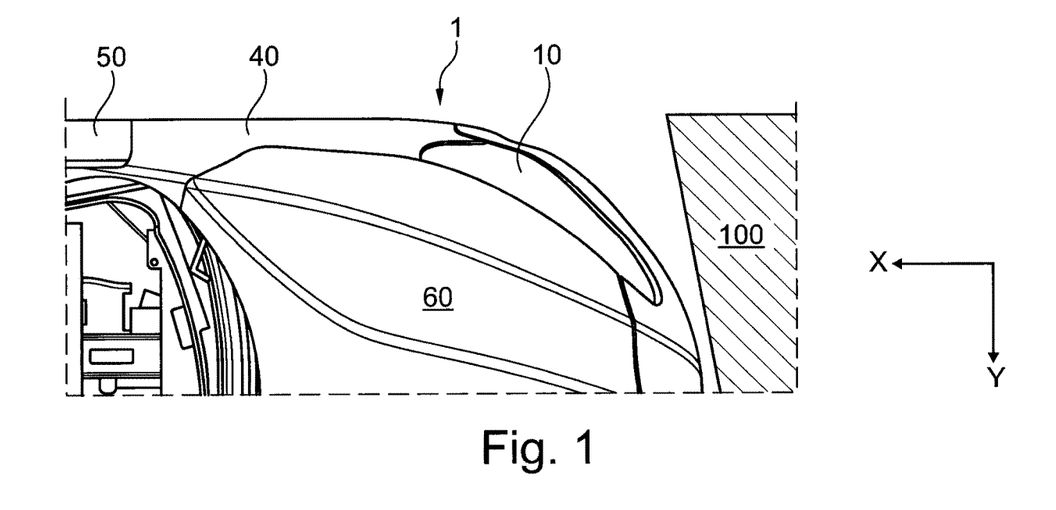
FIG. 1 part of a motor vehicle and an obstacle.
Figure 2:
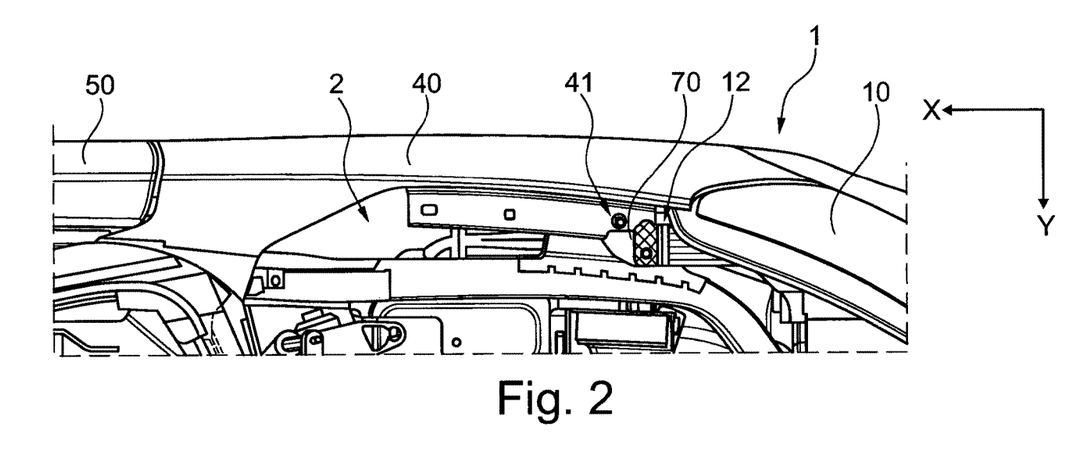
FIG. 2 a detailed illustration of the motor vehicle of FIG. 1.

FIGS. 1 and 2 each show, in a plan view, part of a motor vehicle 1—more precisely, an automobile. This has, in a front region, a headlamp housing 10 which is adjoined by a fender 40 to the rear, as seen in the direction of the X axis. A door 50 is in turn arranged adjacent to the fender 40. A hood 60 adjoins the headlamp housing 10 and the fender 40 on the upper side and to the center of the vehicle. As can be seen in FIG. 2, in which the hood 60 has been removed, the fender 40 is connected to a frame part 70 of a vehicle body 2 via connecting structures 41. The headlamp housing 10 is connected both to the frame part 70 and to the fender 41 via a first connecting portion 12.

Figure 3:
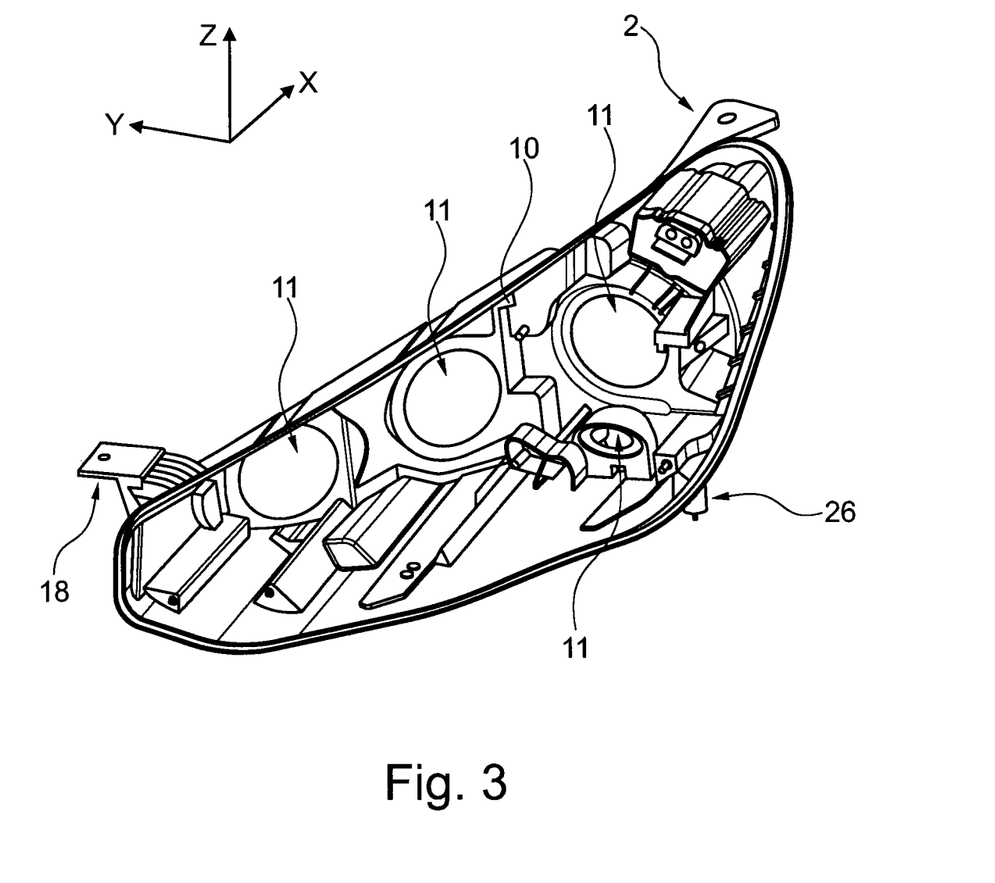
FIG. 3 a perspective illustration of a headlamp housing of the motor vehicle of FIG. 1.

FIG. 3 is a perspective illustration of the headlamp housing 10, which can be made from plastics material in a known manner. A multiplicity of openings 11 for light units (not illustrated) such as low beam, high beam, turn signals etc. can be seen. In addition to the first connecting portion 12, a further second connecting portion 18 arranged further to the front and a third connecting portion 26 arranged toward the underside are arranged on the headlamp housing 10. The second and third connecting portion 18, 26 can serve for connecting the headlamp housing to other body parts or to the vehicle body 2.

Figure 4:
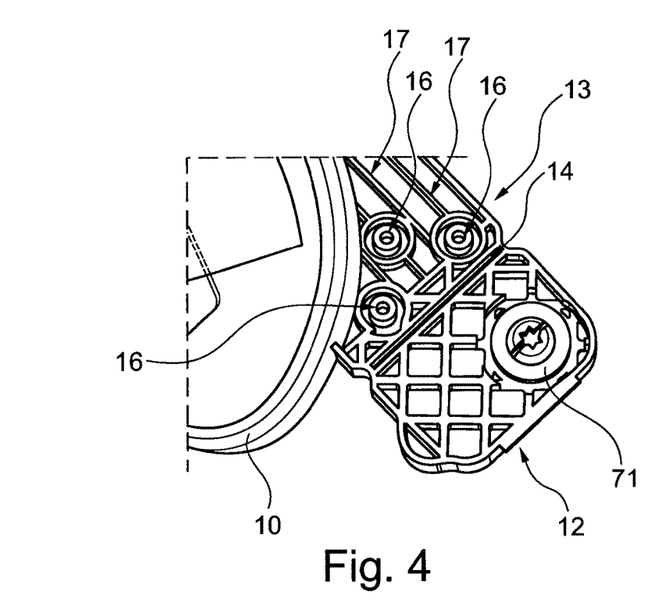
FIG. 4 a perspective illustration of part of the headlamp housing with a first connecting portion.
Figure 7A:
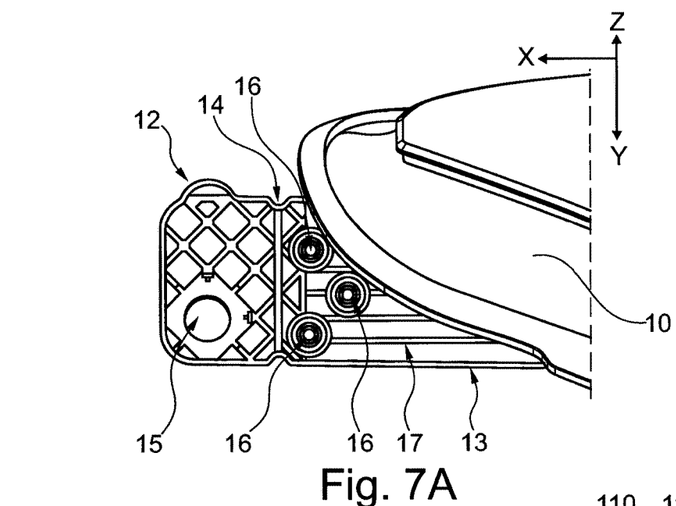
FIG. 7A a perspective illustration of part of the headlamp housing with the first connecting portion.

FIG. 4 is a detailed view in which the first connecting portion 12 adjoins a first neighboring portion 13, wherein a first predetermined breaking point 14 is formed between these portions 12, 13. This is formed substantially by lateral notches and a linearly extending groove. The connecting portion 12 has a first through-opening 15 (visible in FIG. 7A) through which a first screw 71 is guided in order to connect the first connecting portion 12 to the frame part 70. The first neighboring portion 13 has three second through-openings 16, which are not used in normal operation of the motor vehicle 1. To stabilize the first neighboring portion 13, this has a series of first reinforcing webs 17.

Figure 5:
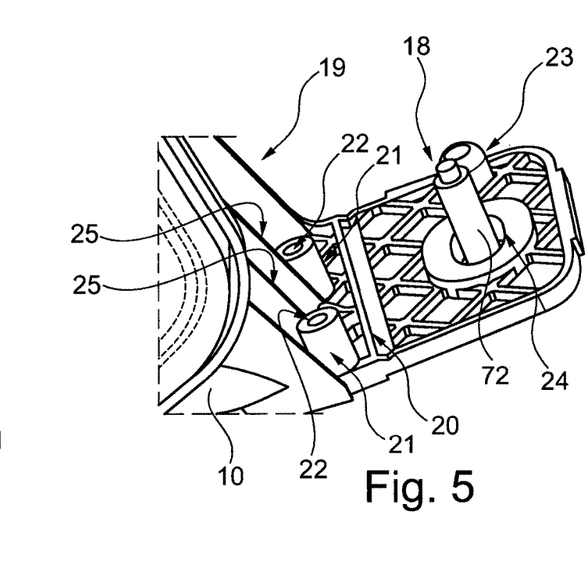
FIG. 5 a perspective illustration of part of the headlamp housing with a second connecting portion.

FIG. 5 is a detailed view which shows that the second connecting portion 18 adjoins a second neighboring portion 19, wherein a second predetermined breaking point 20, like the first predetermined breaking point 14, is formed between these portions 18, 19. The second connecting portion 18 has a third through-opening 24, through which a second screw 72 is guided in order to connect the second connecting portion 18 to the vehicle body 2. A pin element 23 is furthermore provided, which can serve for example for form-fitting connection to the vehicle body 2. The first connecting portion 12 can have, on an underside which is not visible in FIG. 4, a corresponding pin element 23 which serves for form-fitting connection to the fender 40. The second neighboring portion 19 has three fourth through-openings 22, which are not used in normal operation of the motor vehicle 1. In this case, the through-openings 22 are formed inside sleeve portions 21 of the second neighboring portion 19. A series of second reinforcing webs 25 are provided for stabilizing the second neighboring portion 19.

Figure 6:
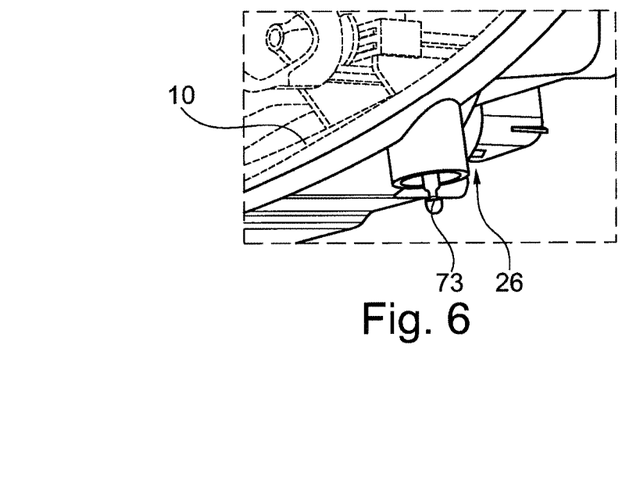
FIG. 6 a perspective illustration of part of the headlamp housing with a third connecting portion.

FIG. 6 is a detailed view with the third connecting portion 26. This has an elastic latching element 73, which is latched in a correspondingly formed opening in the vehicle body 2.

Figure 7B:
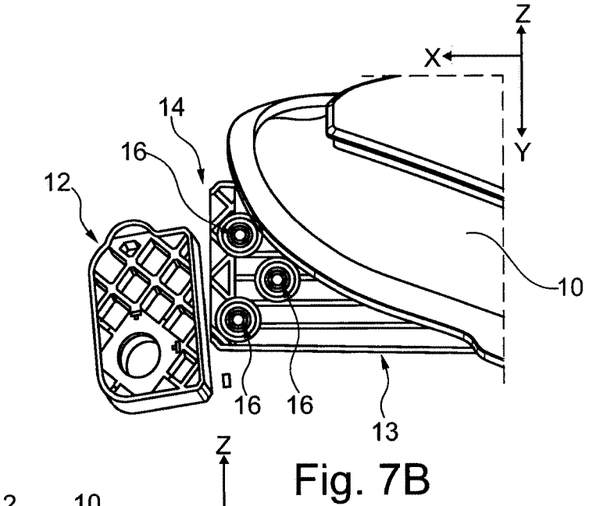
FIG. 7B a perspective illustration of part of the headlamp housing with a separated first connecting portion.
Figure 7C:
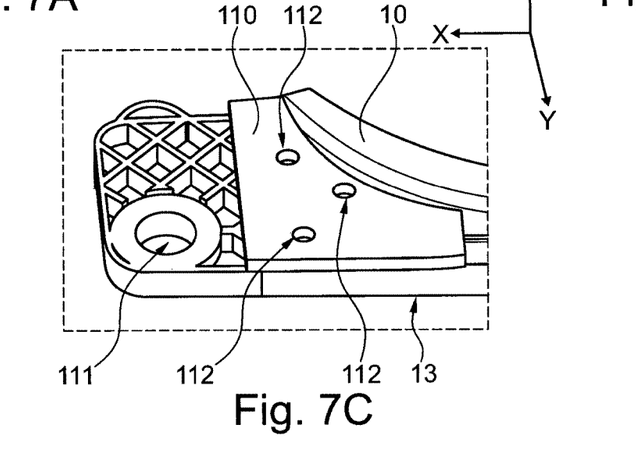
FIG. 7C a perspective illustration of part of the headlamp housing with a first joining part.
Figure 10:
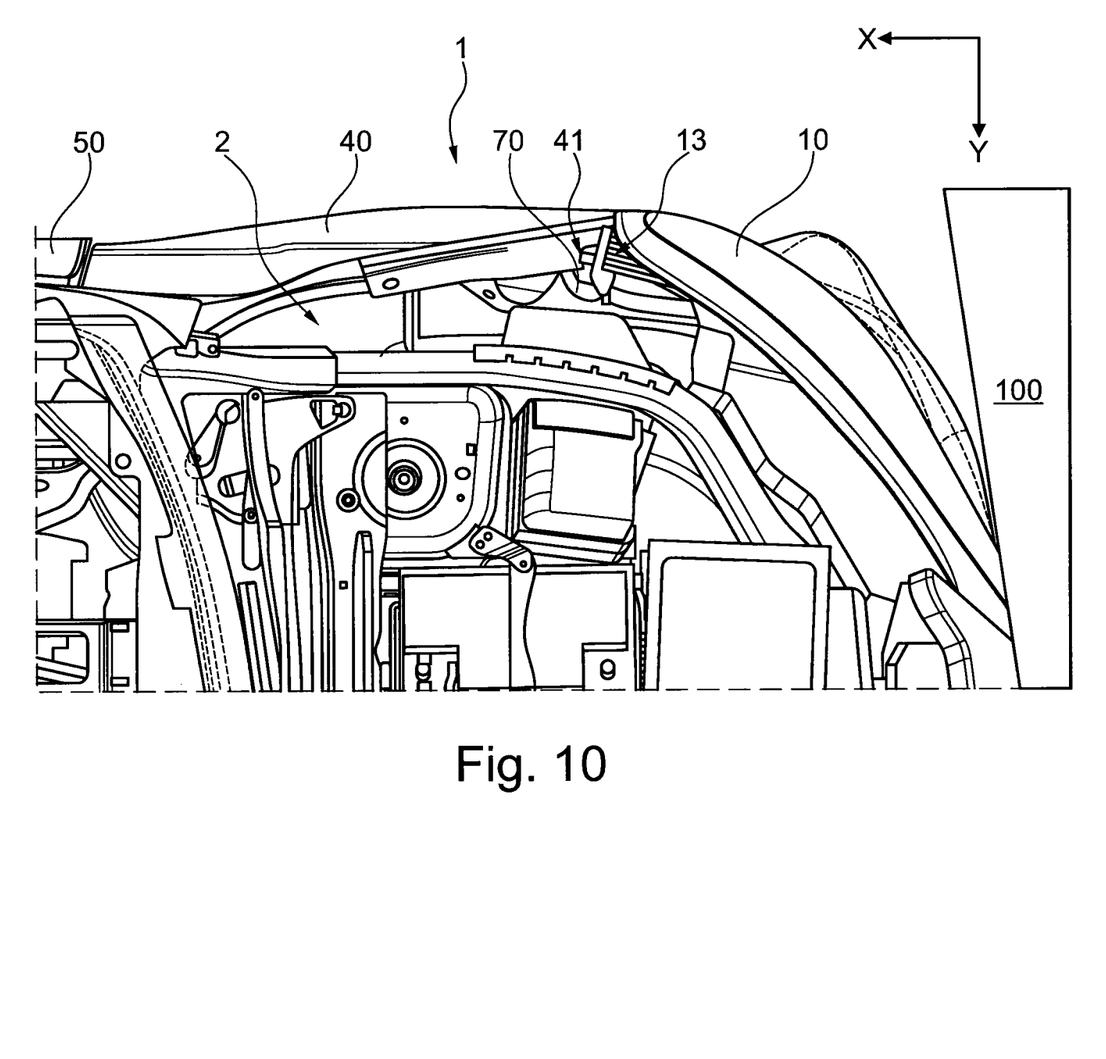
FIG. 10 part of the vehicle and the obstacle following a collision at low speed.

In the event of a collision at low speed, which is illustrated by way of example in FIG. 10, a force is applied to the headlamp housing 10 in relation to the vehicle body 2. If this exceeds a predetermined threshold value, it is provided that the first predetermined breaking point 14 yields as planned. This can be seen with reference to FIG. 7A, which shows the normal state of the headlamp housing 10, and FIG. 7B, which shows the first connecting portion 12 separated from the first neighboring portion 13. The neighboring portion 13 can remain substantially undamaged owing to the presence of the reinforcing webs 17, amongst other things. If this also applies to other parts of the headlamp housing 10, this does not have to be replaced completely but can instead be repaired. To this end, as illustrated in FIG. 7C, a first joining part 110 is used, which is provided to replace the separated first connecting portion 12. It has a fifth through-opening 111 which corresponds in terms of size and position to the first through-opening 15. All in all, the first joining part 110 is designed for form-fitting engagement with the first neighboring portion 13. In particular, it has three sixth through-openings 112 which are each flush with the second through-openings 16 when positioned appropriately. Therefore, the first joining part 110 can be connected with form fit and force fit to the first neighboring portion 13, in that screws (not illustrated here) are guided through the sixth through-openings 112 and the second through-openings 16.

Figure 8A:
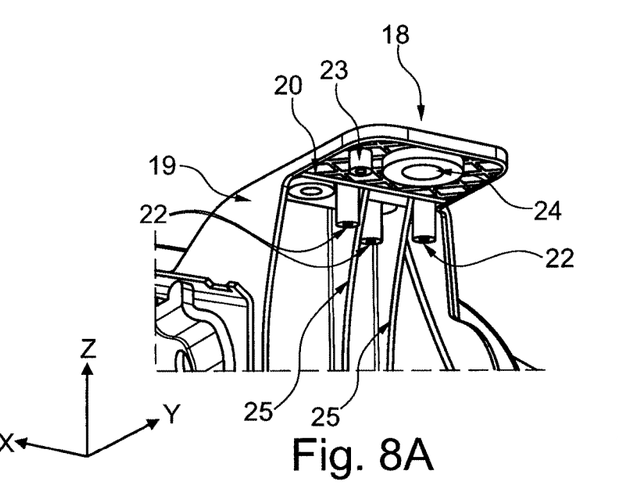
FIG. 8A a perspective illustration of part of the headlamp housing with the second connecting portion.
Figure 8B:
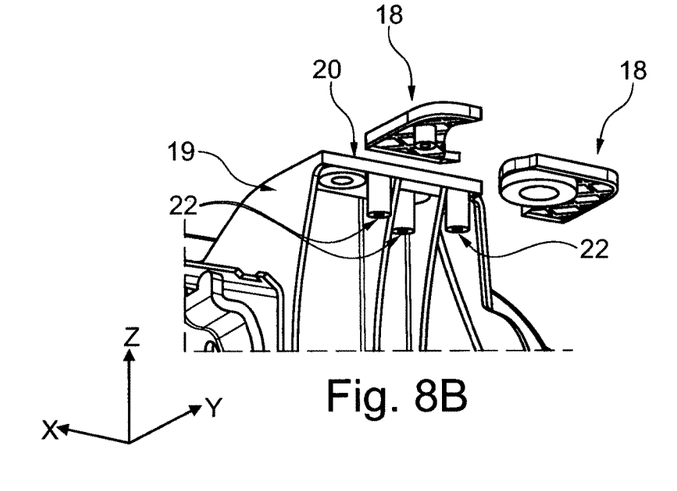
FIG. 8B a perspective illustration of part of the headlamp housing with a separated second connecting portion.
Figure 8C:
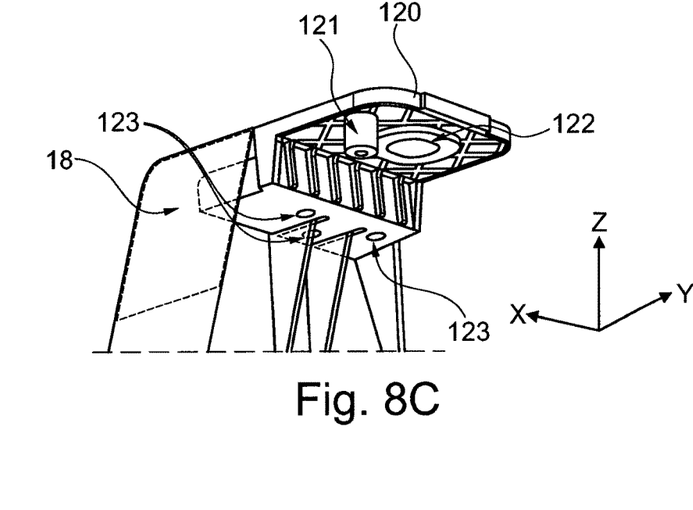
FIG. 8C a perspective illustration of part of the headlamp housing with a second joining part.

In the event of a collision at low speed, the force applied to the headlamp housing 10 also results in the second connecting portion 18 becoming separated as planned, as illustrated with reference to FIG. 8A, which shows the normal state, and FIG. 8B, in which the second connecting portion 18 is separated. In this case, the neighboring portion 19 remains undamaged owing to the presence of the second reinforcing webs 25, amongst other things. Repair is also possible in this case, whereby a second joining part 120 illustrated in FIG. 8C is used. This second joining part replaces the second connecting portion 18 after its separation and therefore has a seventh through-opening 122, corresponding to the third through-opening 24, and a second pin element 121 corresponding to the first pin element 23. Moreover, three eighth through-openings 123 are provided, which are flush with the fourth through-openings 22. A form-fitting and force-fitting connection of the second joining part 120 to the neighboring portion 19 is therefore possible by means of screws.

The third connecting portion 26 is not provided for separation from the headlamp housing 10. Instead, the elastic latching element 73 detaches from the vehicle body 2 in that it is deformed under the application of a corresponding force. All in all, the headlamp housing 10 therefore detaches from the vehicle body 2 and from the fender 40 as planned, whereby both the force applied to the headlamp housing and also the force reacting upon the obstacle 100 remain limited. It is therefore possible to prevent considerable damage to the essential parts of the headlamp housing 10. If surface scratches occur, these can possibly be removed by polishing.

Figure 9A:
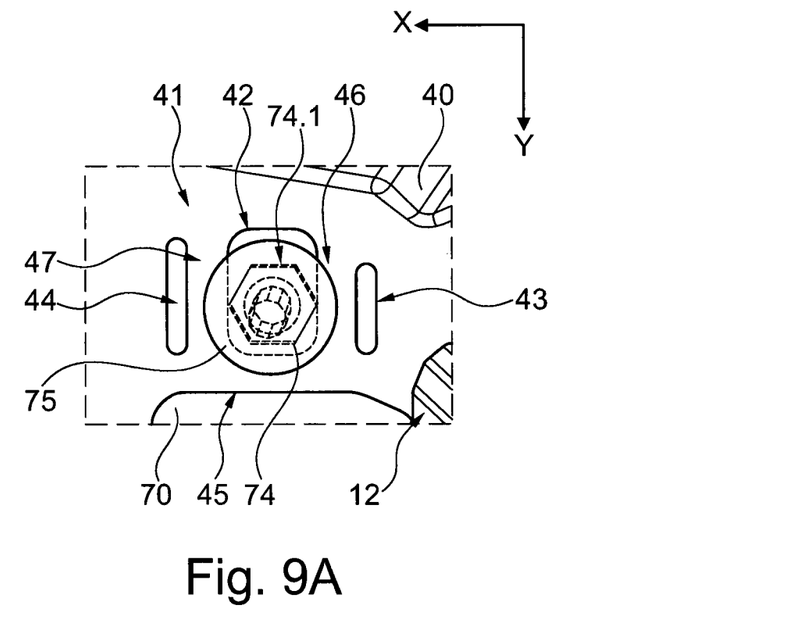
FIG. 9A a detailed view of FIG. 1 with an attaching structure of a fender.
Figure 9B:
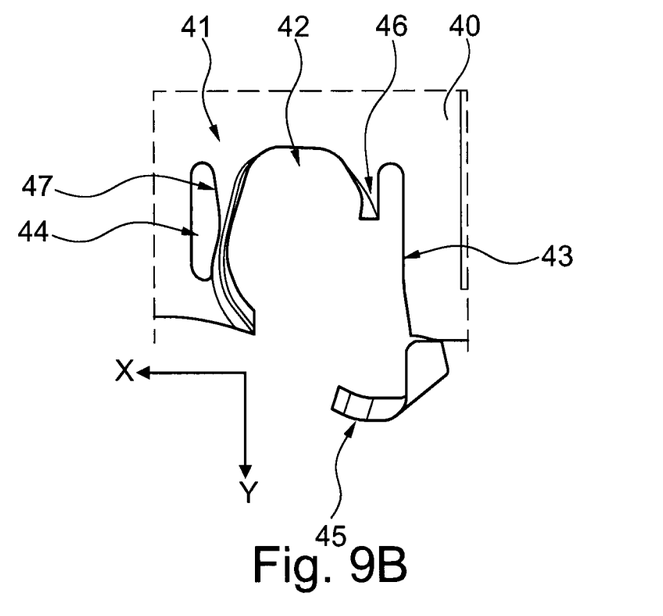
FIG. 9B an illustration of the attaching structure following a collision at low speed.

Although the headlamp housing 10 also detaches from the fender 40, a certain force can still be applied to the fender 40, which could push this rearward in the direction of the door 50. This could result in damage to the paintwork on the door 50, even in the event of relatively small collisions. To prevent this, it is provided that the fender 40 deforms and deflects laterally outward, as indicated in FIG. 10. To promote this sequence, the attaching structure 41 is provided to yield as planned under the application of a force on the part of the headlamp housing 10. In this case, a ninth through-opening 42 with an approximately rectangular cross-section is incorporated in the sheet metal material of the fender 40. A third screw 74, which is secured by a washer 75, is guided through this ninth through-opening 42. The screw 74 is screwed to the frame part 70 of the vehicle body 2. In this case, an extent of the ninth through-opening 42 in the direction of the Y axis is greater (by ca. 80-100%) than an extent of a head 74.1 of the screw 74. Two slots 43, 44 extending in the Y direction are formed in front of and behind the ninth through-opening 42, as seen in the direction of the X axis. Toward the center of the vehicle in the Y direction, the ninth through-opening 42 is delimited by a first web 45, whereof the extent in the Y direction is approximately a third of the extent of the ninth through-opening. The slots 43, 44 are separated from the ninth through-opening 42 by a second web 46 and a third web 47. Under the application of a sufficiently strong force between the fender 40 and the vehicle body 2 or the screw 74 screwed thereto, the screw 74 is pressed against the first web 45 and the second web 46, which ultimately results in at least partial separation of at least one of the webs 45, 46. This is illustrated in FIG. 9B. As a result of the separation, the fender 40 detaches from the vehicle body 2 in this region and can deflect laterally, as shown in FIG. 10. In this case, deformation of, and damage to, the fender 40 is consciously accepted since a rearward movement of the fender 40 is thus substantially prevented. There is therefore no impact with the door 50 and costly repair for possible damage to the paintwork is thereby avoided.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A headlamp repair part for a headlamp assembly including a housing, a plurality of connectors provided on the housing, the connectors including a first portion connected to the housing and a second portion connected to a vehicle, a joint connecting the first and second portions, the joint being predisposed to separate the second portion from the first portion upon application of an impact force to at least one of the connectors, the headlamp repair part comprising:

a joining part including a replication portion corresponding to a shape of the second portion and a re-attachment portion assembled to the first portion after application of the impact force separating the first and second portions, wherein the replication portion is adapted to be attached to the vehicle.

2. The headlamp repair part for the headlamp assembly of claim 1, wherein the joining part includes a re-attachment portion that is attached to the first portion and a replication portion corresponding in shape to the second portion that is adapted to be attached to the vehicle.

3. The headlamp repair part for the headlamp assembly of claim 2, wherein the re-attachment portion is secured by fasteners to through-holes defined by the first portion.

4. The headlamp repair part for the headlamp assembly of claim 1 wherein the first and second portions of the connectors are integral with the housing prior to application of the impact force to the headlamp assembly.

5. The headlamp repair part for the headlamp assembly of claim 1 wherein the second portion includes a first elastic pin that is adapted to be received in an opening defined by the vehicle, and wherein the replication portion includes a second elastic pin that is adapted to be received in the opening defined by the vehicle.

6. A method of repairing a vehicle having headlamp assembly including a housing having a plurality of connectors including a first portion connected to the housing and a second portion connected to the vehicle, and a joint connecting the first and second portions that is predisposed to separate the second portion from the first portion when an impact force applied to the housing exceeds a predetermined level of force, the second portion being separated from the first portion, the method comprising:

providing a joining portion including a re-attachment portion and a replication portion corresponding at least partially in structure to the second portion; and assembling the re-attachment portion to the first portion and the replication portion to the vehicle.

7. The method of claim 6 wherein the replication portion includes attachment features that are adapted to be secured to the vehicle in place of the second portion.

8. A replacement part for a headlamp housing of a vehicle including a connecting structure having a connecting portion and a neighboring portion, wherein the connecting portion is connected to the neighboring portion at a joint, the connecting portion being adapted to be separated from the neighboring portion at the joint in an impact, wherein the neighboring portion remains attached to the headlamp housing after the impact, the replacement part comprising:

a joining part including a replication portion and a flange, the flange being adapted to be attached to the neighboring portion that remains attached to the headlamp housing after the impact, wherein the joining part is adapted to be attached to an adjoining body part.

9. The replacement part of claim 8 wherein the replication portion is identical in shape to the connecting portion.

10. The replacement part of claim 8 wherein the flange defines a first opening, the neighboring portion defines a second opening, and a fastener is received in the first opening and the second opening to attach the flange to the neighboring portion.

11. The replacement part of claim 8 wherein the flange defines a first plurality of openings, the neighboring portion defines a second plurality of openings, and a fastener is received in each of the first plurality of openings and the second plurality of openings to attach the flange to the neighboring portion.

12. The replacement part of claim 8 wherein the flange is shaped to be form fit to the neighboring portion.

13. The replacement part of claim 8 wherein the neighboring portion includes a first elastic pin that is adapted to be received in an opening defined by the vehicle, and wherein the replication portion includes a second elastic pin that is adapted to be received in the opening defined by the vehicle.

* * * * *